US012008389B2

(12) United States Patent
Krakirian et al.

(10) Patent No.: US 12,008,389 B2
(45) Date of Patent: Jun. 11, 2024

(54) FLEXIBLE RESOURCE ASSIGNMENT TO PHYSICAL AND VIRTUAL FUNCTIONS IN A VIRTUALIZED PROCESSING SYSTEM

(71) Applicant: Cavium, LLC., Santa Clara, CA (US)

(72) Inventors: Shahe Krakirian, Palo Alto, CA (US); Jason Zebchuk, Watertown, MA (US); Wilson Parkhurst Snyder, II, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 171 days.

(21) Appl. No.: 16/189,119

(22) Filed: Nov. 13, 2018

(65) Prior Publication Data
US 2020/0150993 A1    May 14, 2020

(51) Int. Cl.
  *G06F 9/455*    (2018.01)
  *G06F 13/24*    (2006.01)
  *G06F 13/28*    (2006.01)
  *G06F 13/42*    (2006.01)

(52) U.S. Cl.
  CPC .......... *G06F 9/45558* (2013.01); *G06F 13/24* (2013.01); *G06F 13/28* (2013.01); *G06F 13/4282* (2013.01); *G06F 2009/45579* (2013.01); *G06F 2213/0026* (2013.01)

(58) Field of Classification Search
  None
  See application file for complete search history.

(56) References Cited

U.S. PATENT DOCUMENTS

| 10,191,864 | B1 * | 1/2019 | Bshara | G06F 9/4555 |
| 11,003,616 | B1 * | 5/2021 | Nakibly | G06F 13/4013 |
| 2005/0060704 | A1 * | 3/2005 | Bulson | G06F 9/468 718/1 |
| 2008/0288661 | A1 * | 11/2008 | Galles | G06F 13/10 710/3 |
| 2012/0265916 | A1 * | 10/2012 | Nordstrom | G06F 13/28 710/308 |

(Continued)

FOREIGN PATENT DOCUMENTS

| CN | 101452424 | 6/2009 |
| CN | 104808971 | 7/2015 |

(Continued)

OTHER PUBLICATIONS

Li Shuai et al., "Optimization method of cryptographic device interrupt frequency based on single-root I/O virtualization," Application Research of Computers, vol. 36, Issue 9, Jun. 19, 2018, pp. 2798-2802, 2808.

(Continued)

*Primary Examiner* — Wynuel S Aquino

(57) ABSTRACT

A method and system for flexibly assigning hardware resources to physical and virtual functions in a processor system supporting hardware virtualization is disclosed. The processor system includes a resource virtualization unit which is used to flexibly assign hardware resources to physical functions and also flexibly assign local functions to virtual functions associated with one or more of the physical functions. Thereby, standard PCI software is compatible with the physical functions and any associated virtualized hardware resources that have been flexibly assigned to the virtual and local functions.

28 Claims, 9 Drawing Sheets

(56) References Cited

U.S. PATENT DOCUMENTS

| | | | | |
|---|---|---|---|---|
| 2012/0284448 | A1* | 11/2012 | Ayzenfeld | G06F 9/48 |
| | | | | 710/313 |
| 2016/0098372 | A1* | 4/2016 | Boyle | G06F 13/4072 |
| | | | | 710/313 |
| 2016/0353367 | A1 | 12/2016 | Vrzic et al. | |
| 2017/0277573 | A1* | 9/2017 | Huynh | G06F 9/45558 |
| 2018/0239649 | A1* | 8/2018 | Druzhinin | G06F 3/061 |
| 2018/0331900 | A1* | 11/2018 | Kakaiya | G06F 9/4411 |
| 2018/0349161 | A1* | 12/2018 | Jain | G06F 13/102 |
| 2019/0260690 | A1* | 8/2019 | Sun | G06F 9/45558 |
| 2019/0266117 | A1* | 8/2019 | Duncan | G06F 13/4004 |
| 2020/0004445 | A1* | 1/2020 | Benisty | G06F 3/0664 |

FOREIGN PATENT DOCUMENTS

| | | |
|---|---|---|
| CN | 106095563 | 11/2016 |
| CN | 106796529 | 5/2017 |
| CN | 107430570 | 12/2017 |
| CN | 108139937 | 6/2018 |

OTHER PUBLICATIONS

Vincenzo Eramo et al., "An Approach for Service Function Chain Routing and Virtual Function Network Instance Migration in Network Function Virtualization Architectures," IEEE/ACM Transactions on Networking, vol. 25, Issue 4, Mar. 2, 2017, pp. 2008-2025.

\* cited by examiner

FLEXIBLE RESOURCE ASSIGNMENT TO PHYSICAL AND VIRTUAL FUNCTIONS IN A VIRTUALIZED PROCESSING SYSTEM

BACKGROUND OF THE INVENTION

Field of the Invention

This invention relates to a flexible mechanism for assigning various hardware resources to physical functions and virtual functions.

DESCRIPTION OF THE RELATED ART

Software applications require actual physical hardware resources, such as processors for executing the computer code, memory for storing data, and network circuits for communications. However, software applications do not fully utilize the available physical hardware resources. Further complicating matters is that some software applications may consume a great deal of one or more physical resources, whereas other software applications may consume less overall physical resources or less of one particular type of physical resource. This inefficiency poses a financial burden because hardware resources are costly to implement and costly to operate. Under utilizing the available hardware resources is wasteful. Conversely, if there are not enough dedicated hardware resources, the software applications may run extremely slowly, if it runs at all.

In an effort to increase the efficiency of hardware resource utilization, a technique known as "virtualization" has been developed. Basically, virtualization refers to the act of defining multiple "virtual" machines from a single set of hardware resources, and a host machine contains the actual physical resources on which virtualization takes place. Multiple virtual machines run multiple software applications from multiple users. A specialized virtual software package is loaded onto one or more physical host devices so that the physical hardware resources of the host device(s) can be shared amongst many different users. By enabling the sharing of the actual physical hardware resources, virtual machines make more efficient use of expensive, existing hardware resources. Moreover, because each user accesses the host device(s) through their own virtual machine, from the viewpoint of the user, it appears as if they have their own dedicated hardware resources. Presently, the degree of virtualization is increasing to meet the ever expanding demands imposed by highly sophisticated software applications (e.g., cloud computing, artificial intelligence, big data, etc.) to efficiently allocate the underlying complexity of hardware resources.

FIG. 1 shows an example of a prior art virtualization model. An incoming packet of data is initially received by the packet input unit (PKI) 101. The PKI is responsible for receiving packets from the network. It parses the data packets and assigns the packets to particular work flows. Based thereon, PKI requests buffer pointers for the packet from the allocator unit (FPA) 102. Within FPA 102, there exists physical function 103 and multiple virtual functions 104-106. Associated with a VF are memory pools which are defined by a list of pointers to buffers to which data is written and stored thereon. There are also pointers to work queue entries which store the control and metadata information for particular packets. It is the responsibility of the Schedule/Synchronization/Order unit (SSO) 107 to schedule the workflow to be performed by one or more of the core ARM processors (AP) 112-114. The SSO 107 includes a physical function 108 and multiple group functions 109-111 to facilitate moving data to/from the ARM processor cores 112-114. The Packet Output Unit (PKO) 115 has a PF 116 and multiple VFs 117-119 for outputting packets and their associated control information. It should be noted that other prior art virtualization models exist in different formats. These other virtualization models also have their specific designs for physical and virtual functions.

Regardless of what type of virtualization model is implemented, from a software standpoint, each physical and virtual function unit appears like a separate device. Hence, each unit requires its own dedicated software driver. In order to assign a set of physical hardware resources, each guest needs its own software driver for its assigned unit (e.g., PKO, SSO, and FPA). Each one of these units has a separate software driver loaded under a particular guest. For example, Guest1 115 has separate drivers loaded for its PKO, SSO, and FPA. Likewise, Guest2 116 has its own separate drivers loaded for its PKO, SSO, and FPA. This holds true for each additional guest.

Although this workaround solution of implementing separate drivers on a guest-by-guest basis supports enhanced levels of virtualization, it is non-ideal because it creates an undue overhead burden. The sheer number of software drivers that need to be actively managed and the coordination between the drivers impose a serious processing challenge. Certain operating systems (e.g., Linux) restrict the allowed types and forms of coordination between such drivers. This deviation from the normal operating system standard could negatively impact the performance of software applications. Furthermore, specially trained software programmers must craft code to meet the unique needs imposed by the multiple software drivers' requirements.

SUMMARY OF THE INVENTION

The present invention pertains to a method and system for flexibly assigning hardware resources to physical and virtual functions in a processor system supporting hardware virtualization. Administrative software defines and sets up a number of physical functions and virtual functions for virtualizing a number of hardware resources. The administrative software also defines and sets up a number of local functions for designated logical blocks in the processor system. A physical function can have two layers of virtualization. It can be flexibly assigned a set of virtual functions and/or a set of local functions assigned to the virtual functions or the physical function itself. By flexibly assigning the virtualized hardware resources in this manner, efficiency is improved for the various guest operating systems running on the processor system supporting hardware virtualization. Furthermore, the physical functions appear like PCI devices, thereby conforming to standard PCI software.

DETAILED DESCRIPTION

Figure 1:
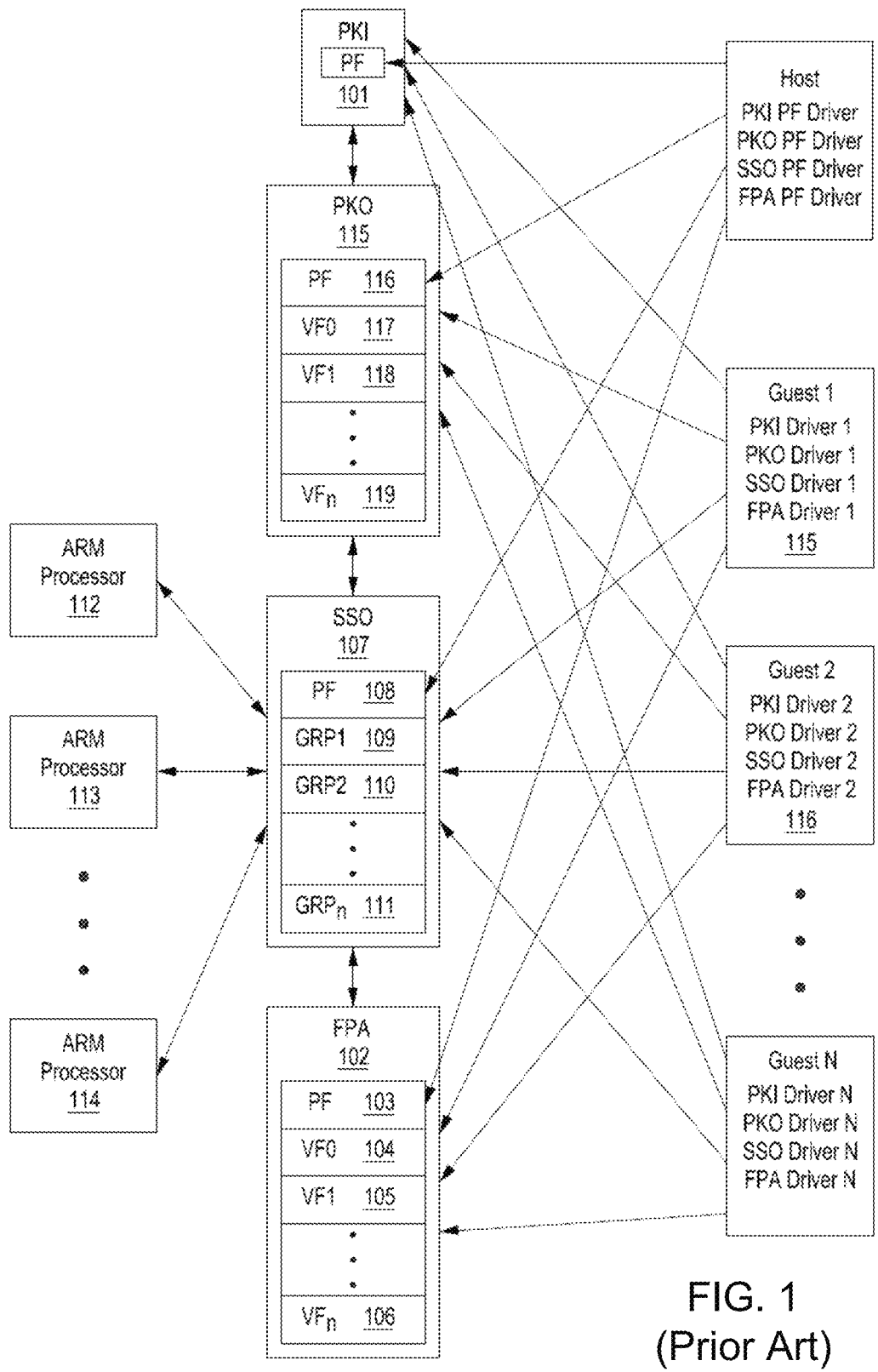
FIG. 1 shows an example of a prior art virtualization model.

The present invention pertains to a method and system for flexible resource assignment to physical and virtual functions in a virtualized processing system. In one embodiment, one or more sockets are implemented whereby one or more functional blocks are given per socket. Each of the functional blocks can have a range of local functions (LFs), along with a set of hardware resources per LF. In one embodiment, local functions may include instruction queues, packet or scheduler work queues, timer rings, and memory pools. It is also possible that a functional block does not have any local functions. A Resource Virtualization Unit (RVU) per socket is used to virtualize LF resources across one or more functional blocks. It is also possible to have multiple RVUs per socket. There are one or more PFs per RVU. Optionally, one or more hardware VFs (HVWFs) are assigned per RVU. Administrative software assigns a particular HVWF or a range of consecutive HWVFs as a PCIe VF (or a range of VFs) under a selected PCIe PF. This enables standard PCI-compatible software to discover the RVU PFs and the associated VFs. Note, this view to software may be an illusion for software; coprocessors are not required to physically reside on/under a physical PCI bus.

In one embodiment of the present invention, each PF is presented to software as a "PCI" device comprising of one or more functions (e.g., numbered 0, 1, ..., N–1), whereby function number 0 is the PF itself, and function numbers 1 and above are the VF under that particular PF. Consequently, the combination of PF number and function number uniquely identifies a PF or VF. This unique identifier is named a PF_FUNC. In another embodiment, a group of PF_FUNC spanning one or more PFs may be presented to software as a "PCI device." It is possible that potentially all RVU PFs may be presented to software as "PCI devices". Hence, for each functional block with one or more LFs, administrative software may assign each LF to a PF_FUNC. In other words, the administrative software may assign an LF to either a PF or a VF under a particular PF. In general, PF and VF are PCI standard terms; LF, AF, PF_FUNC and slot are related to embodiments of the present invention.

When multiple LFs from a functional block are assigned to the same PF_FUNC, each LF is assigned to a unique "slot" within the PF_FUNC. A functional block may be: (a) a no-slot block, meaning that it does not have LFs, (b) a single-slot block, meaning that at most one LF from the block can be assigned to a PF_FUNC, or (c) a multi-slot block, meaning that multiple LFs from the block can be assigned to a PF_FUNC. Furthermore, LFs from one or more single-slot and/or multi-slot functional blocks may be assigned to the same PF_FUNC. The PF or VF software driver of each PF_FUNC controls and uses the resources of all LFs assigned to that PF_FUNC. This may include LFs from one or more functional blocks.

Besides per-LF hardware resources, each functional block generally has shared hardware resources. These resources include, but are not limited to, DMA engines, administrative configuration and status registers, etc. These shared resources belong to the Administrative Function (AF). In one embodiment, the administrative software may limit AF access to one or more PFs or allow AF access by all PFs. Other embodiments may hard-assign AF access to a designated PF, a dedicated "AF-only" PF, or always allow AF access by all PFs. In one embodiment, for each PF, administrative software may allow access to the AF resources of a sub-set of functional blocks. For example, PF1 may access AF resources for functional block A and B, while PF2 may access AF resources B and C.

Figure 2:
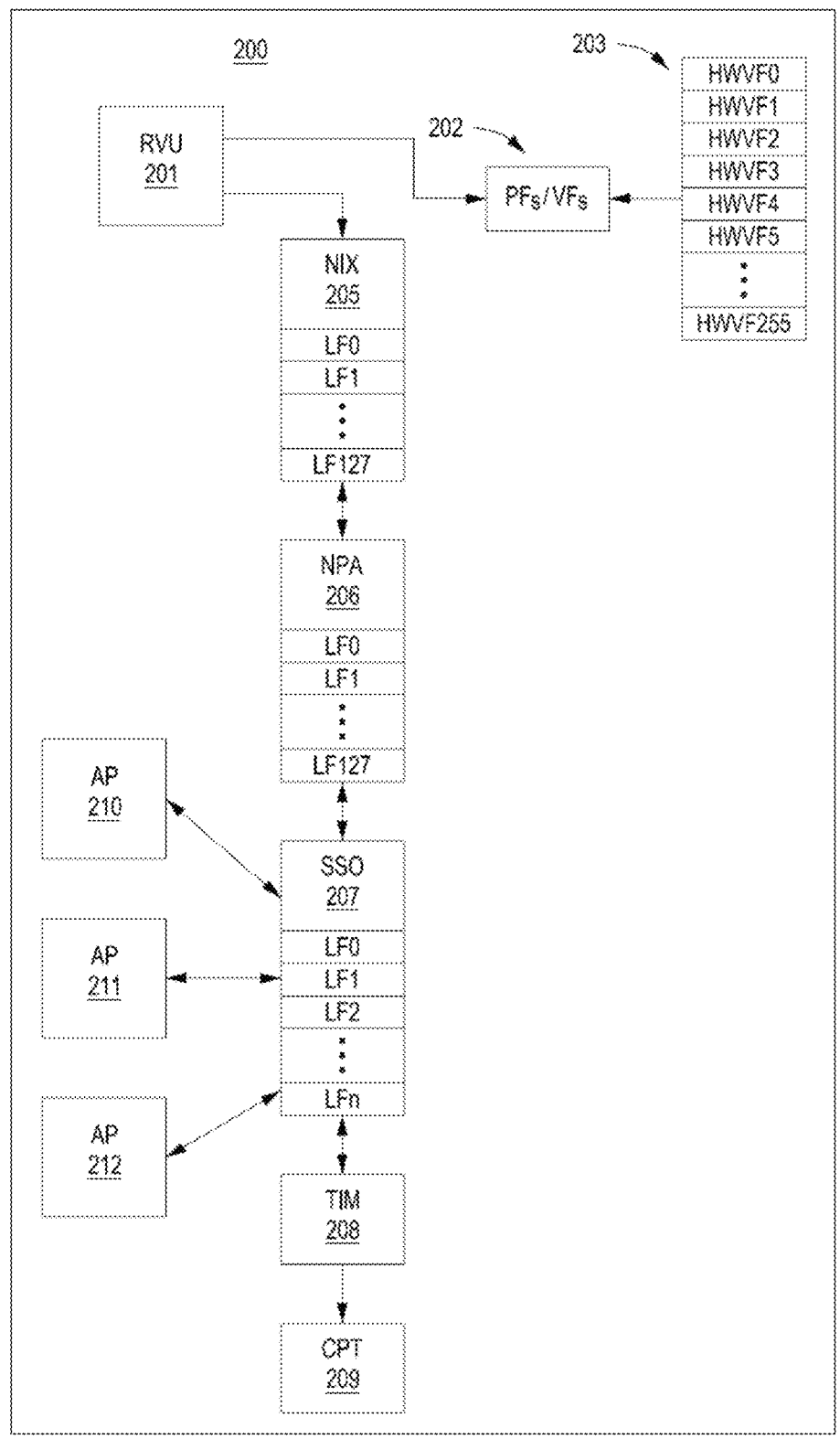
FIG. 2 illustrates an exemplary virtualized processing system for implementing one embodiment of the present invention.

FIG. 2 illustrates an exemplary virtualized processing system 200 for implementing one embodiment of the present invention. This framework can be used to flexibly assign hardware resources to physical and virtual functions. The RVU unit 201 provides an abstraction layer whereby hardware resources are assigned to either the physical function units (PFs) and/or the hardware virtual function units (HWVFs). In one embodiment, there are sixteen PFs (PF0-PF15) and two hundred and fifty-six HVNFs 203. It should be noted that any number of PFs and HWVFs can be implemented, depending on the particular system design specification. The software can allocate a range of HWVFs to a PF. For example, HWVF0-HWVF2 can be allocated to PF0 by the software. If HWVF0-HWVF2 are flexibly allocated to PF0, they are mapped as VF0-VF2 under PF0. The next range of HWVF(s) can be allocated to the next PF. For example, HVWF3-HWVF4 can be flexibly allocated to PF1, in which case they are mapped as VF0-VF1 under PF1. This process is repeatable for allocating the HVWFs 203 to PFs 202 to meet a wide range of design criteria. Consequently, this feature enables flexible hardware virtual function units to be assigned to physical function units on demand. Moreover, this model follows the widely adopted PCIe standard. The present invention confers a great advantage in that there is no need to have unique knowledge in order to alter the software to meet any special constraints.

A Network Interface Controller (NIX) unit 205 is used to handle packet communications. NIX unit 205 includes a range of local functions (e.g., LF0-LFn). NIX 205 can be used to send and receive packets via external Ethernet and/or PCIe interfaces and/or via internal loopback interfaces. NIX 205 can be implemented as a single-slot block that supports multiple LFs. Each NIX LF supports one million or more send queues, one million or more receive queues, and one million or more completion queues. Each receive queue can deliver packets either via the SSO 207 or via a memory completion queue. Furthermore, each packet transmission can use SSO 207 and/or a memory completion queue for completion/error notifications. Every LF can send and receive packets via any of the Ethernet ports, a loopback unit (LBK) or a system DMA packet interface unit (SDP). Administrative software is used to provision an NIX LF into each PF or VF that requires NIX functionality.

Likewise, the Network Pool Allocator (NPA) 206 has its own local functions LFs. The NPA 206 manages pools of memory and supports efficient allocation and freeing of memory pointers from software, from RVU functional block(s) and from other coprocessors. In one embodiment, the NPA 206 is a single-slot block that supports multiple LFs. Administrative software provisions an NPA LF into each PF or VF that requires NPA functionality.

A Schedule, Synchronize, and Order Unit (SSO) 207 has a number of local functions LF0-LFn. An SSO unit is described in US Patent Number US20130111000A1 and is incorporated by reference herein in its entirety. In one embodiment, there are 256 LFs, whereby each LF is a SSO group. Work is added to an SSO LF (i.e., group) by either software, any other RVU functional block (e.g., NIX 205, CPT 209, or TIM 208 or another coprocessor). Administrative software may provision between zero and all of the SSO 207 LFs to a given PFNF. Within each PFNF, the SSO LFs are assigned to unique, consecutive slots, starting at slot 0. Administrative software provisions at least one SSO LF to the same PF/VF in order to make effective use of the SSO 207. SSO 207 schedules the workflow to be performed by one or more of the core ARM processors (AP) 210-212. In one embodiment, the SSO unit 207 is split between two RVU functional blocks, SSO and SSOW. The SSO is a multislot block with up to 256 LFs. The SSOW is a multislot block with up to 52 LFs, whereby each LF is a SSO work-slot. Software uses an SSOW LF (i.e., work-slot) to schedule work previously added to an SSO LF (i.e., a group). Administrative software may provision between zero and all of SSOW's LFs (e.g., 52) to a given PFNF. Within each PFNF, the SSOW LFs are assigned to unique, consecutive slots, starting at slot 0. Administrative software provisions at least one SSO LF and at least one SSOW LF to the same PF/VF to make effective use of the SSO 207.

A Scheduled Timers unit (TIM) 208 enables software to schedule SSO work-queue entries for submission to SSO 207 at a future time. The TIM unit 208 is a multislot block with up to 256 LFs, whereby each LF is a single timer ring. Administrative software may provision between zero and all of TIM's LFs (e.g., 256) to a given PFNF. Within each PFNF, the LFs are assigned to unique, consecutive slots, starting at slot 0.

A Cryptographic Accelerators unit (CPT) 209 includes microcoded engines to accelerate symmetric hash, encryption, modular exponentiation, error correction codes, and common public-key algorithms. In one embodiment, CPT unit 209 is a multislot block that supports sixty-four LFs. each CPT LF supports a single instruction queue. Administrative software may provision between zero and all of the CPT's LFs (e.g., sixty-four) to a given PFNF. Within each PFNF, the LFs are assigned to unique, consecutive slots, starting at slot 0.

Thus, from a software perspective, the software determines the number of PFs it is going to need and also the number of corresponding VFs under each PF. Software then creates these PFs and VFs and assigns the actual hardware resources to these PFs and VFs. For example, each PF or VF under a PF can be assigned a single NIX LF, a single NPA LF, and one or more SSO LFs. The single NIX LF and single NPA LF is sufficient because they are highly scalable (i.e., a single LF can support over a million queues or memory pools). The administrative software program is responsible for the provisioning. Consequently, a VF driver that runs the software that controls this VF has access to a set of resources from the NIX LF, the NPA LF, and the SSO LFs. The resources assigned under that VF are available, controlled, and managed by a single software driver. Thus, instead of creating and supporting a very large number of SSO groups and hard assigning the groups to a particular RVU VF, regardless of whether they will be used, the administrative software can now decide on how many VFs it is going to create and also has the capability to allocate these resources directly to a particular VF. Furthermore, this architecture allows the implementation of a set number of resources to be allocated in each function block. Administrative software can then perform the provisioning to create a single VF that can take all of the SSO resources. This can all be controlled by a single driver. Likewise, the TIM and CPT units provide multiple LFs to the same PF or VFs. This enables software to mix and match whatever hardware resources are needed for a particular application for a particular PF or VF driver. Moreover, the software can create, under a particular PF, one or more VFs, whereby each VF has one NIX LF; one NPA LF; and create a different PF that only has SSO resources. The actual configuration can be predefined in firmware. Essentially, the two virtualization abstraction layers comprised of the HVWFs and LFs enable virtualization software to flexibly assign various sets of the hardware functions and local functions to the physical functions and virtual functions according to particular software application requirements, wherein different software applications can have different sets of hardware functions assigned to its physical functions and virtual functions. This provides a great amount of efficiency, scalability, and flexibility.

Figure 3:
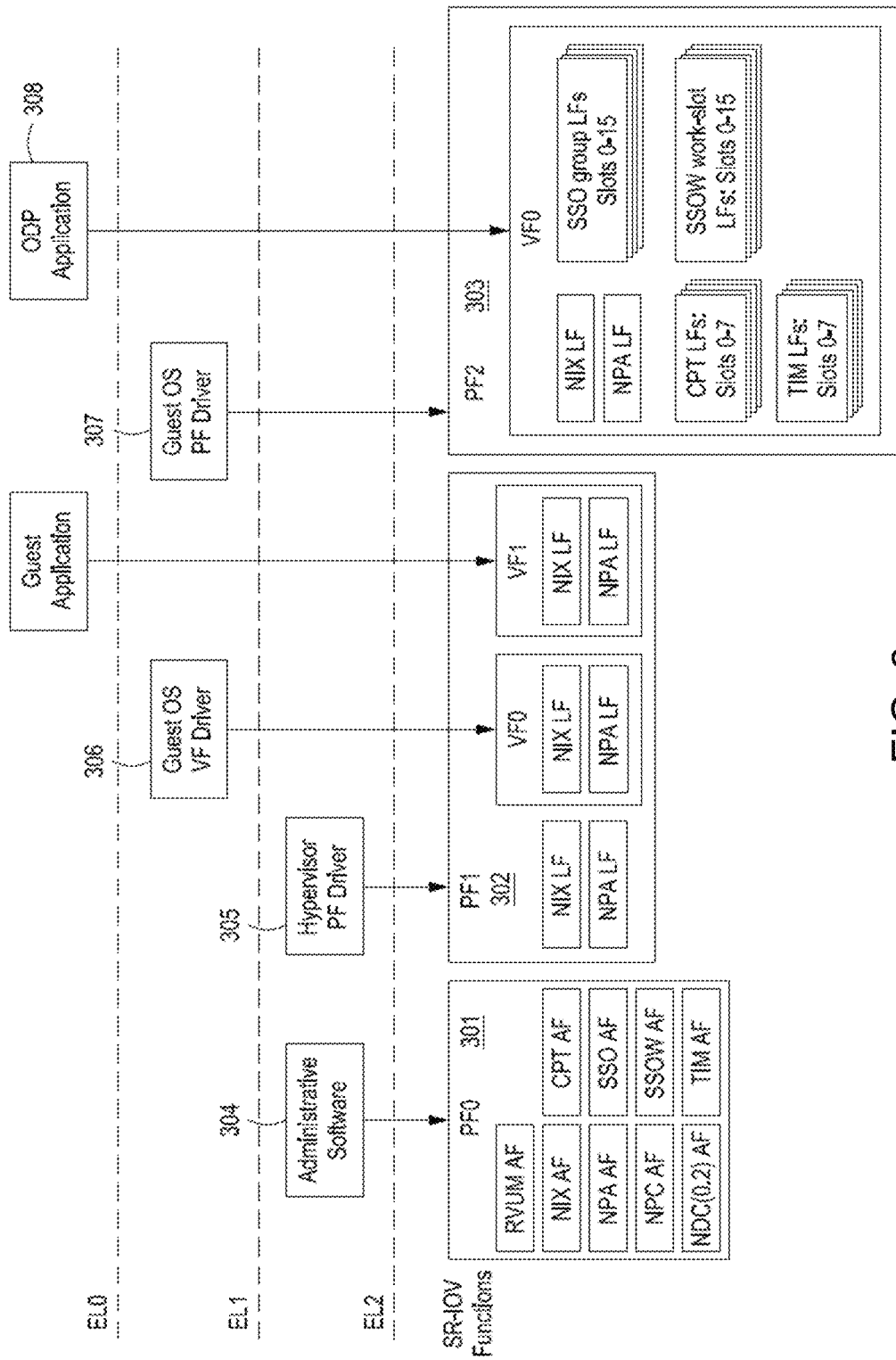
FIG. 3 shows a detailed diagram for an RVU according to one embodiment of the present invention.

FIG. 3 shows a detailed diagram for an RVU and its associated software drivers according to one embodiment of the present invention. Each RVU PCI device contains one PCIe SR-IOV physical function. See for example PF0 301, PF1 302, and PF2 303. Any reference to PFn refers to the physical function in the nth RVU PCI device. Each PF can be assigned a number of functional block local functions (LFs) to provide different features within the PF. For example, PF0 301 is designated as the administrative PF and includes RVUM AF; NIX AF; CPT AF; NPA AF; SSO AF; NPC AF; SSOW AF; NDC(0..2) AF; and TIM AF. PF1 can have its own set of LFs. In this example, PF1 302 includes NIX LF; NPA LF; a NIX LF and NPA LF under VF0; and an NIX LF and NPA LF under VF1. Likewise, PF2 303 has a VF0 that includes its NIX LF; NPA LF; sixteen SSO group LFs (slots 0-15); eight CPT LFs (slots 0-7); sixteen SSOW work-slot LFs (slots 0-15); and eight TIM LFs (slots 0-7). In fact, for enhanced flexibility, each RVU PF may have multiple associated PCIe SR-IOV virtual functions (VFs). Each VF may be assigned a number of functional blocks LFs to provide different features with the VF.

The Administrative Function (AF) registers and interrupts are a subset of the PF registers and interrupts. The AF registers provision the RVU and manage the RVU functional blocks. The RVU has a single, common set of AF registers. Typically, the AF registers are accessed by administrative software through PF0. In such a configuration, the PF drivers for PF1 to PF15 request administrative software access to the AF registers on the PF software's behalf. They do not necessarily access the AF registers directly. In general, the administrative software 304 is responsible for provisioning the functionality of each RVU SR-IOV function. Typically, the administrative software304 may also be responsible for accessing AF registers and for handling AF interrupts.

As described above, each RVU functional block contains a number of local functions (LFs) that represent a set of hardware resources, e.g., instruction queues, packet queues, memory pools, etc. These LFs may be assigned to any RVU PF or VF. The LF provides the same interface and functionality regardless of whether it's mapped to a physical or a virtual function. For example, a NIX LF can provide one million send/receive queues within either a PF or VF. Administrative software 304 can assign a combination of LFs from different RVU functional blocks to the same PF or VF so that a single PCIe function provides the capabilities of multiple RVU functional blocks. This enables a single PF/VF software driver to easily interact with multiple functional blocks. For example, Hypervisor PF Driver 305 can interact directly with the NIX and NPA LFs in PF1 302. Similarly, Guest OS VF Driver 306 can interact directly with the NIX and NPA LFs in PF1 302's VF0, and ODP Application 308 interacts with the NIX, NPA, CPT, TIM, SSO and SSOW LFs in PF2 303's VF0. For some RVU functional blocks (e.g., SSO 207, CPT 209, and TIM 208), software can assign multiple LFs (e.g., up to 256) from the same functional block to an individual PF or VF, for example, to provide multiple CPT queues or TIM rings within a single PFNF.

When multiple LFs from the same block are assigned to the same PF or VF, each LF is assigned to a unique slot within that PF or VF. The specific resources represented by a single LF depend on the functional block. For each RVU functional block type, when assigning LFs to a PFNF, the LFs should be assigned to consecutive slots starting at zero. For example, if four LFs of the same type are assigned to a PFNF, they should be assigned to slots 0-3.

In one embodiment, the RVU has five different classes of functional blocks. First, AF only no-slot blocks are accessed via the AF. They do not have any LFs that can be mapped to PFsNFs, and all registers reside in the AF. Next, a utility block has multislot local functions that are statically provisioned to each RVU PF and VF. Each RVU PF and VF contains 256 LMT LFs assigned to LMT slots 0-255. Software does not need to provision these LFs. In the case of single-slot blocks (e.g., NIX and NPA), an LF can represent a configurable collection of hardware resources. for example, a single NIX LF can support up to one million send queues. For multislot blocks (e.g., CPT 209, SSO 207, TIM 208), each LF typically represents the smallest configurable unit. For example, a CPT LF supports one single instruction queue. The multislot nature of the block allows aggregation of multiple queues, rings, etc. into a single PFNF.

In one embodiment, an RVU Master (RVUM) unit is a fifth class of functional block that provides global provisioning of all RVU PCI devices and manages the PCI configuration space, including handling of MSI-X registers, function-level resets etc. The RVUM contains 256 hardware virtual functions (HWVFs) which encompass the hardware resources necessary to support up to 256 VFs across the sixteen RVU devices. Software provisions VFs to each of the sixteen PFs by assigning between 0-128 HWVFs to each PF. The RVUM has distinct PF and VF registers instead of having common LF registers.

In one embodiment, a Large Atomic Store Unit (LMT) enables the processor cores 210-212 to initiate large atomic stores to the RVU functional blocks. The LMT is an example of a utility block. The LMT automatically provisions 256 LFs to each RVU PF and VF. This ensures that a PF/VF driver 305-307 always has a number of LMT regions within its address space to user for LMTST operations. Each LF contains registers to support large atomic store operations of up to 128 bytes to an RVU functional block. These can be used to enqueue an instruction in a CPT queue or to submit one or more packet descriptors to NIX 205 for transmission.

Figure 4:
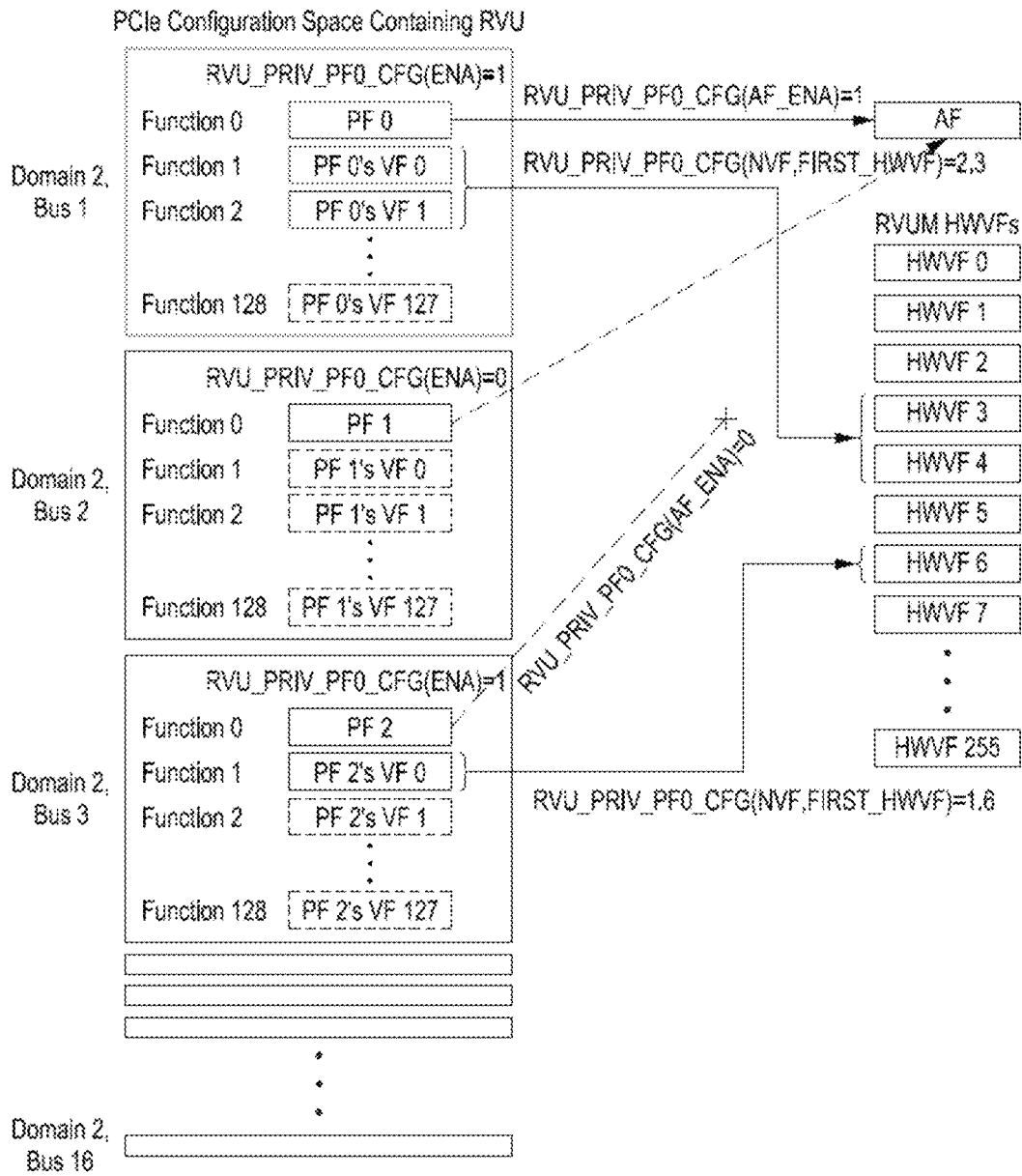
FIG. 4 shows a PCIe function layout.

FIG. 4 shows an example PCIe function layout. The RVU creates and manages up to sixteen PFs. Each RVU device belongs on a separate PCIe bus, and each bus contains an SR-IOV physical function at PCI function 0, and up to 255 SR-IOV virtual functions in PCI functions 1-255. Each PF can be optionally enabled or disabled via configuration register RVU_PRIV_PF(x)_CFG[ENA]. When disabled, the PCI configuration space for the physical function and its associated PCI device is inaccessible. When a PF is enabled, it may optionally have access to the AF registers and interrupts, as determined by RVU_PRIV_PF(x)_CFG[AF_ENA]. For example, PF0 can access the AF registers, while PF2 cannot access the AF registers. In this figure, PF1 is disabled, so the path between PF1 and the AF registers is shown as a dashed line to indicate that if PF1 is enabled, it might optionally have access to the AF registers.

In an alternative embodiment, each RVU device may span multiple consecutive PCIe busses to support additional SR-IOV virtual functions. In this scenario, the first PCIe bus contains an SR-IOV physical function at PCI function 0, and up to 255 SR-IOV virtual functions in PCI functions 1-255, and the other PCIe busses contain additional SR-IOV virtual functions associated with the SR-IOV physical function on the first bus.

In some applications, for LF to LF hardware communications, hardware-level communication is required between two LFs in different functional blocks. For example, an LF in a network interface block may initiate requests to free and allocate buffers to/from a pool in a buffer allocator block's LF. For each LF that initiates communication in a source block, administrative software assigns an LF in the destination block. In one embodiment, software assigns a PF_FUNC and an optional slot in the destination block, which maps to an LF in the destination block. In some use cases, the initiating and destination LFs may belong to the same PF_FUNC (i.e., controlled by the same PF or VF driver). In other use cases, the PF_FUNCs will be different, allowing hardware-level communication between LFs controlled by different drivers.

For cross-socket LF to LF hardware communication, in some applications, hardware-level communication is required between two LFs from the same functional block in different sockets, and thus, under different RVUs. For example, a buffer allocator block in one socket may free and allocate buffers to/from a pool in a buffer allocator LF of another socket. For each LF that initiates communication in a source socket's functional block, administrative software assigns an LF from the same functional block in the destination socket. In one embodiment, software assigns a PF_FUNC and optional slot in the destination socket, which maps to an LF of the functional block in the destination socket. If the selected LF in the destination socket has multiple hardware resources (e.g., multiple buffer pools), the communicating message from the source socket may need to target a specific resource within the destination LF. In one embodiment, the LFs in both sockets have an identical number of hardware resources. Administrative software specifies each resource in one socket as "local" or "remote" and specifies the opposite designation to the corresponding same-numbered resource in the other socket. In other words, each remote resource in one socket points to a corresponding same-numbered local resource in the other socket and vice versa. When an LF in one socket receives a request to a remote resource, it forwards the request to the corresponding local resource in the other socket (e.g., with a message that specifies a PF_FUNC, optional slot, and resource number). In another similar embodiment, administrative software selects a range of resources in each socket as remote resources. Furthermore, cross-socket communication can be extended to three or more sockets by specifying a destination socket number for each remote resource. Alternatively, software assigns a socket number to every resource that supports cross-socket communications. The resource is local if its assigned socket number matches the socket that it belongs to and is remote otherwise.

In one embodiment, each PF_FUNC (PF or VF) has one or more unique physical address ranges (e.g., PCI BARs). A BAR is generally used to access memory-mapped I/O, specifically control and status registers (CSRs) implemented by hardware. A BAR may also be used to access memory (e.g., non-I/O). Each BAR size is a power of two and is generally fixed. The base address is naturally aligned to the size and may be fixed or programmable. The BAR's offset bits are defined as the lower address bits used to select a specific address/offset within the BAR. For each LF assigned to a PF_FUNC, software accesses the LF's CSRs via one or more BARs of the PF_FUNC. For example, a BAR in each PF_FUNC is used to access the CSRs of all LFs assigned to the PF_FUNC. A predefined subset of the BAR's offset bits identifies the functional block. If a functional block is single-slot, the remaining offset bits select a specific LF CSR. If a functional block is multi-slot, a second predefined subset of the BAR's offset bits identify the LF slot, and the remaining bits select a specific LF CSR.

For each PF that provides access to administrative CSRs, software accesses the AF CSRs via one or more BARs of the PF. For example, a BAR in the PF (other than the LF BAR described above) may be used to access all AF CSRs. A predefined subset of the BAR's offset bits identifies the functional block. The remaining offset bits select a specific AF CSR in the functional block.

In one embodiment, RVU PFs provide three discoverable PCIe BARs. BAR 0 is used for AF registers. BAR 2 is used for per-PF registers. BAR 2 is also used for the RVU functional blocks' LF registers when an LF is mapped to a PF. BAR 4 is for use by the AF-PF mailboxes. RVU VFs provide two discoverable BARs. BAR 2 is used for RVU functional block registers for the LFs mapped to a given VF, the VF-PF mailbox registers and MSIX registers provided by RVUM, and the LMT block's LMTLINE and LMTCANCEL address regions. BAR 4 is for use by the VF-PF mailboxes. Each BAR region is partitioned between RVU functional blocks. The address offsets indicate an address offset relative to the start of the RVU functional block region within a BAR.

Figure 5:
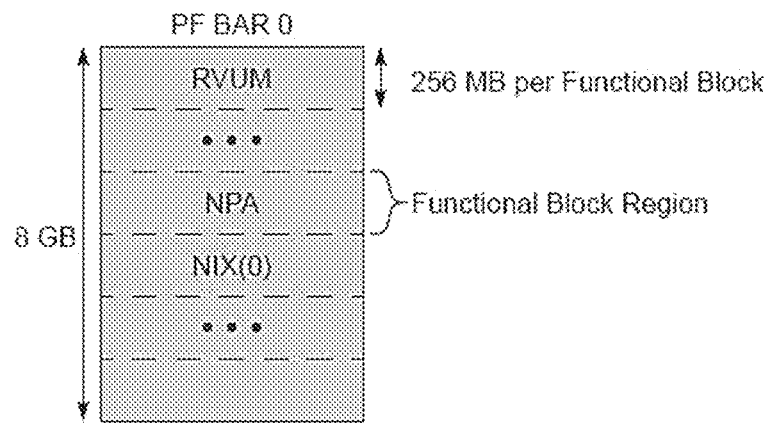
FIG. 5 shows an example of a PF BAR 0 table according to an embodiment of the present invention.

In one embodiment, for PF BAR 0 addresses, the PF BAR 0 table shown in FIG. 5 illustrates that PF BAR 0 has one region for each RVU functional block. The address of a register in PF BAR 0 for a given RVU functional block can be computed as:

```
uint64_t rvu_af_reg_addr(uint64_t pf_bar0, RVU_BLOCK_ADDR_E block_type,
uint64_t reg_offset) {
    RVU_AF_ADDR_S af_addr = { [BLOCK] = block_type, [ADDR] = reg_offset};
    return pf_bar0 + af_addr;
}
```

Where pf_bar0 is the value found during PCIe discovery, block type selects the RVU functional block, and the offset is determined from a table.

Figure 6:
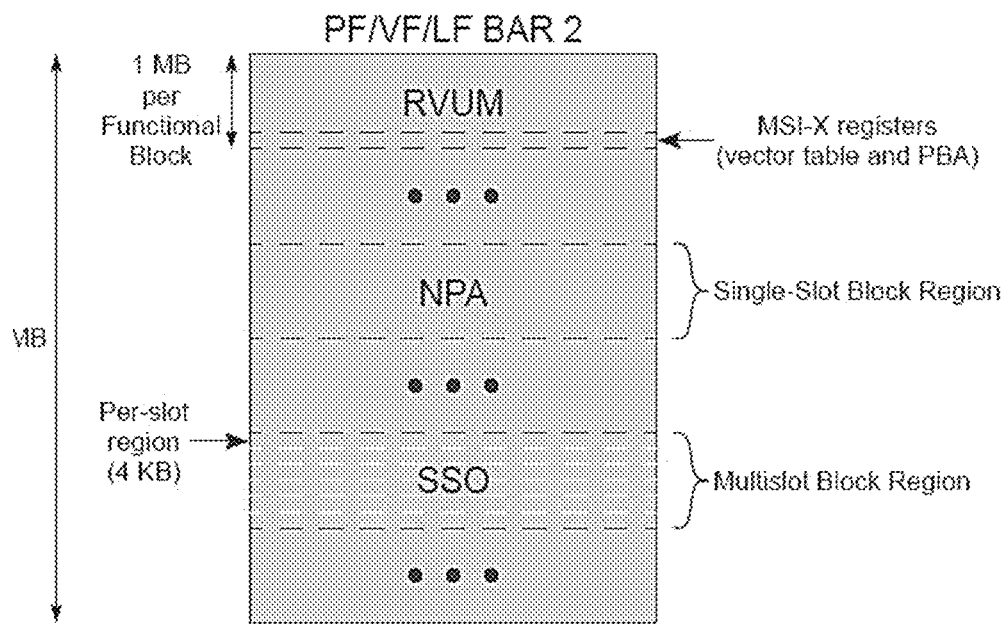
FIG. 6 shows an example of a table where each PF/VF BAR 2 has one region for each RVU functional block according to an embodiment of the present invention.

In one embodiment, for PF BAR 2 addresses, the table shown in FIG. 6 shows that each PF/VF BAR 2 has one region for each RVU functional block, with additional per-slot regions for each multislot block. The address of a register in PFNF BAR 2 for a given RVU functional block can be computed as:

```
uint64_t rvu_lf_reg_addr(uint64_t bar2_base, RVU_BLOCK_ADDR_E block_type,
uint64_t slot, uint64_t offset) {
    RVU_FUNC_ADDR_S lf_addr = { [BLOCK] = block_type, [LF_SLOT] = slot,
        [ADDR] = offset};
    return bar2_base + lf_addr;
}
```

Where bar2_base is the PF/VF BAR2 value found during PCIe discover, block type selects the RVU functional block, slot is zero for single-slot blocks (NPA and NIX) or the LF slot number for multislot blocks (CPT, SSO, SSOW, and TIM), and the offset is determined from a table. All registers with an address table CSR type of RVU_PF_BAR2, or RVU_PFVF_BAR2 use this addressing scheme. Note that most PF/VF BAR2 registers are referred to as LF BAR2 registers because an LF presents the same set of BAR2 registers when mapped to either a PF or a VF. It should also be noted that RVU functional block LFs are assigned to consecutive LF slot numbers starting at zero for each functional block. For example, when assigning eight SSO LFs and four SSOW LFs to a VF, the SSO LFs are assigned to SSO slots 0-7, and the SSOW LFs are assigned to SSOW slots 0-3.

For DMA translation, if address translation is supported and enabled, administrative software configures and manages a DMA address translation table for each PF_FUNC (PF or VF). Two types of memory are defined for DMA: LF memory is memory that is managed by the associated PF or VF driver; AF memory is memory that is managed by administrative software. When hardware executes DMA to or from LF memory, it uses the translation table of the PF_FUNC to which the LF is assigned. When hardware executes DMA to or from AF memory, it uses the translation table of a designated PF. One embodiment uses PF number 0's translation table. Another embodiment utilizes software to select a PF or VF translation table to be used for each functional block's AF.

For interrupts, hardware resources in an LF may generate interrupts which are delivered to the associated PF_FUNC. Likewise, shared AF resources in each functional block may generate interrupts which are delivered to a designated PF. This assumes the standard PCI MSI-X mechanism is used for interrupt delivery. Other delivery mechanisms are also possible. Administrative software provisions an MSI-X table (i.e., a table of MSI-X vectors) for each PF_FUNC. In one embodiment, administrative software allocates a contiguous memory space for storing the MSI-X tables and assigns a subset of the space for each PF_FUNC's MSI-X table. Different PF_FUNCs may have different MSI-X table sizes. Each LF that can generate interrupts has a defined set of MSI-X vectors. When administrative software assigns an LF from a functional block to a PF_FUNC, it also assigns each vector in the LF to a vector number in the PF_FUNC's MSI-X table. For example, software assigns all the vectors in the LF (numbered 0 to N) to a contiguous range of vector numbers (X to X+N) in the PF_FUNC's MSI-X table. The AF interrupts are delivered to a designated PF. A functional block may have shared AF resources that generate interrupts with a defined set of MSI-X vectors. For each functional block that generates AF interrupts, administrative software assigns each AF vector to a vector number in the designated PF's MSI-X table. In one embodiment, software assigns all the AF vectors in a functional block (numbered 0 to N) to a contiguous range of vector numbers (X to X+N) in the PF's MSI-X table. If address translation is supported and enabled, the address of each MSI-X message is translated using the associated PF_FUNC's translation table.

Figure 7:
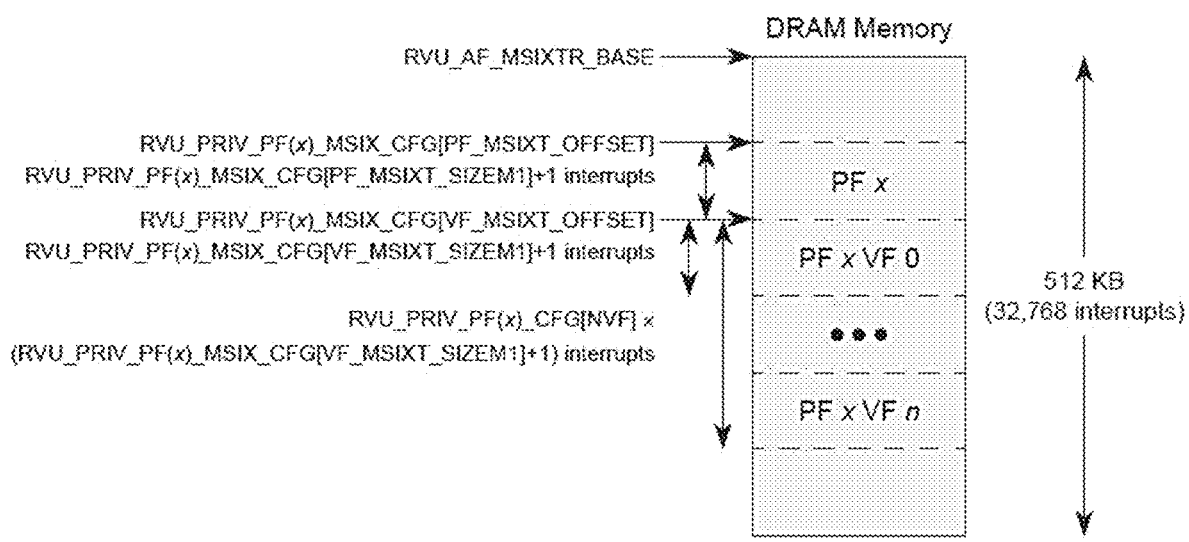
FIG. 7 shows an example of an RVU MSI-X Table Backing Store in an embodiment of the present invention.

In one embodiment, the RVU implements standard PCIe MSI-X interrupts, but relies on a backing store in memory to store MSI-X tables (with address, data, and control fields) and pending hit arrays. In one embodiment, interrupts are flexibly assigned from a plurality of functional blocks to different PCIe MSI-X interrupt vectors belonging to a plurality of virtual and physical functions. Once administrative software allocates and configures the RVU MSI-X backing store, PF and VF drivers can discover the MSI-X interrupt control registers using the standard PCIe MSI-X capability structures. Administrative software allocates an LLC/DRAM memory region to act as a backing store for the MSI-X tables for all RVU PFs and VFs. The memory region is a single, contiguous region with space for one 16-byte RVU MSI-X vector structure for each interrupt that RVU supports. Administrative software partitions the backing store region between PFs and VFs as shown in the RVU MSI-X Table Backing Store shown in FIG. 7.

The start address for the region is writing to RVU_AF_M-SIXTR_BASE, and the RVU_PRIV_PF(x)_MSIX_CFG registers assign portions of the table to each PF and its associated VFs. Administrative software ensures that the MSI-X table regions assigned to different PFsNFs do not overlap. In addition to partitioning the MSI-X backing table, administrative software maps the interrupt vectors for the different functional blocks to specific interrupt vectors for each PF and VF. The table shown in FIG. 8 shows an example mapping for PF0.

Figure 8:
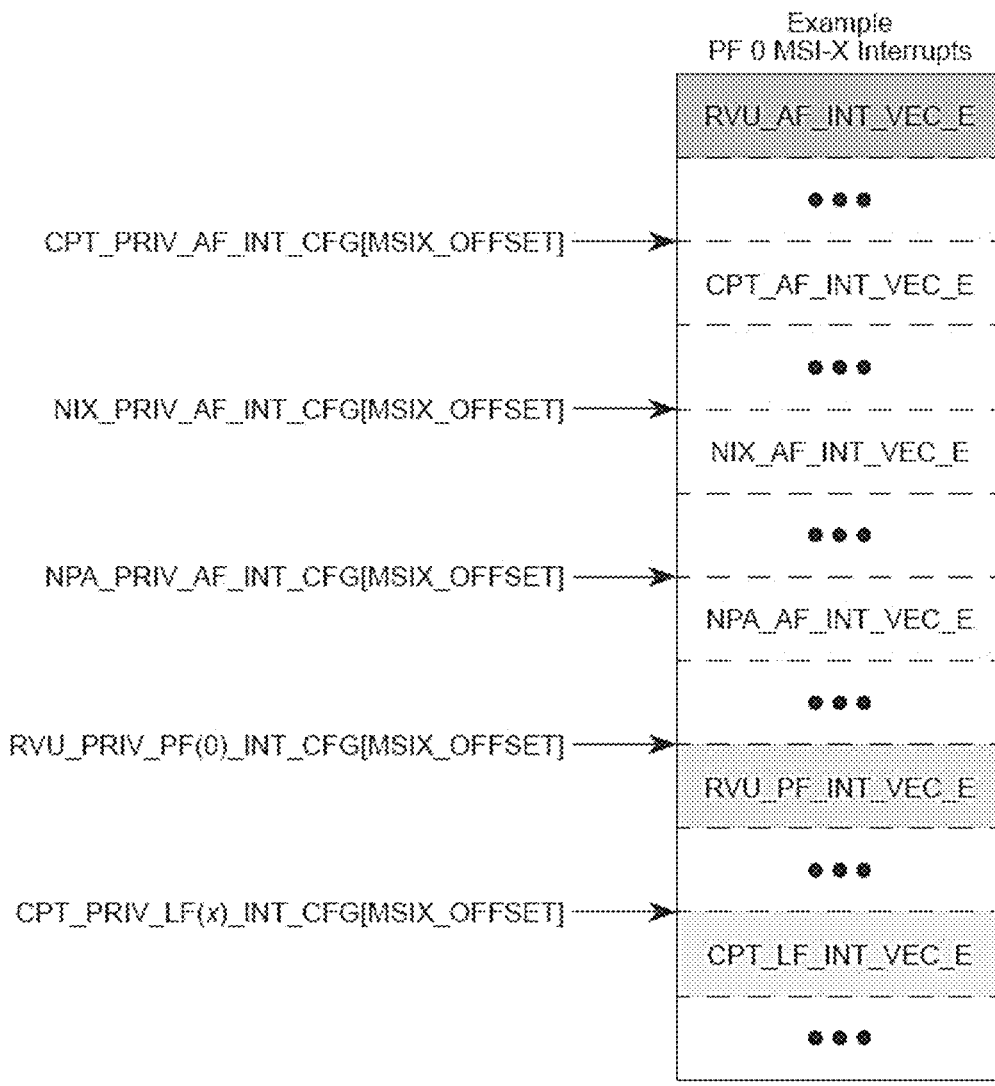
FIG. 8 shows an example of a mapping of interrupt vectors for PF0 in an embodiment of the present invention.

As shown in FIG. 8, the PF0 MSI-X vectors include:
RVUM AF interrupts, enumerated by RVU_AF_INT_VEC_E;
AF interrupts for each RVU functional block, enumerated by
block_AF_INT_VEC_E;
RVUM PF interrupts, enumerated by RVU_PF_INT_VEC_E; and
RVU functional block LF interrupts for any LFs optionally assigned to PF0, enumerated by block_LF_INT_VEC_E.

All AF interrupts map to PF0. The RVUM AF interrupts (enumerated by RVU_AF_INT_VEC_E) have a fixed mapping starting at vector 0. For the remaining RVU function block AF interrupts, administrative software writes the initial vector for each RVU functional block using block_PRIV_AF_INT_CFG[MSIX_OFFSET].

In addition, every PF contains a set of RVU PF interrupts enumerated by RVU_PF_INT_VEC_E which is mapped using RVU_PRIV_PF(x)_INT_CFG[MSIX_OFFSET].

Finally, a PF may optionally have a number of RVU functional block LFs mapped to it. If any LFs are mapped to a PF, then administrative software maps the associated LF interrupts (enumerated by block_LF_INT_VEC_E) to specific vectors using the appropriate registers as listed below:
CPT_PRIV_LF(x)_INT_CFG[MSIX_OFFSET];
NIX_PRIV_LF(x)_INT_CFG[MSIX_OFFSET];
NPA_PRIV_LF(x)_INT_CFG[MSIX_OFFSET];
SSO_PRIV_LF(x)_HWGRP_INT_CFG[MSIX_OFFSET];
SSOW_PRIV_LF(x)_HWS_INT_CFG[MSIX_OFFSET]; and
TIM_PRIV_LF(x)_INT_CFG[MSIX_OFFSET].

A PF will only have LF interrupts for those LFs which have been assigned to it, e.g., if no NIX LFs are assigned to a PF, then the PF MSI-X interrupts will not include the NIX_LF_INT_VEC_E interrupts.

Figure 9:
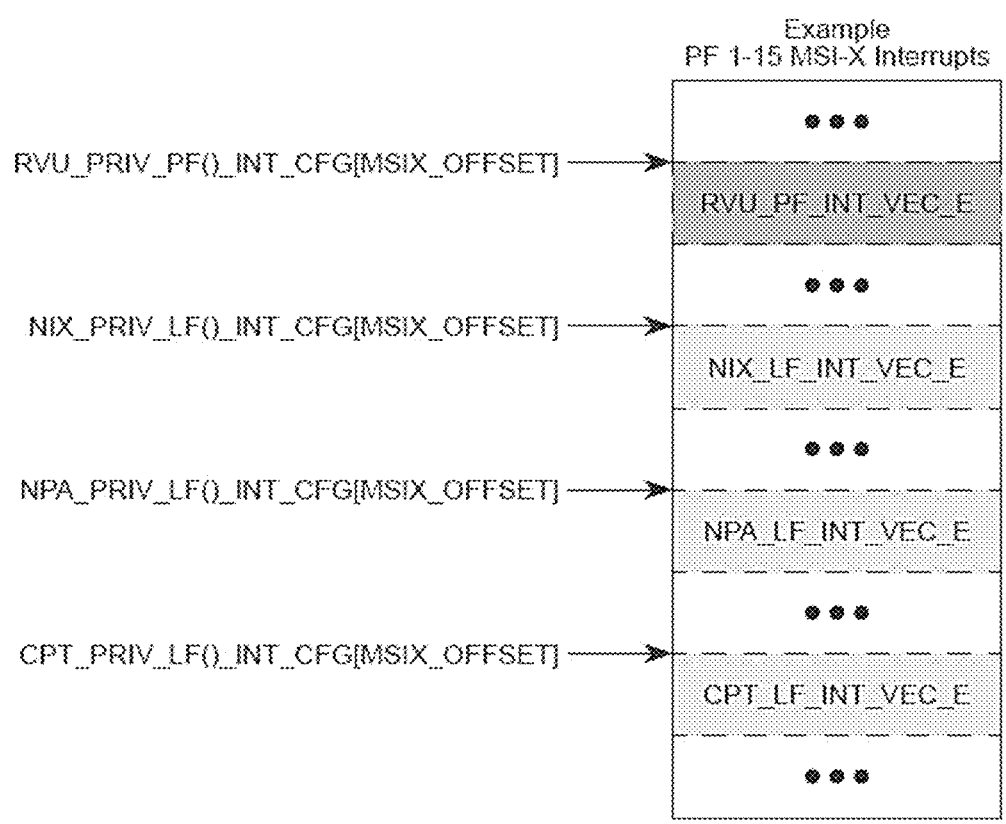
FIG. 9 shows an example of MSI-X vector mapping for RVU PFs in an embodiment of the present invention.

The table shown in FIG. 9 shows an example of a MSI-X Vector Mapping for RVU PF 1-15.

Unlike PF0, the other PFs do not include any AF interrupts. As shown in FIG. 9, PF1-15 includes:
RVUM PF interrupts, enumerated by RVU_PF_INT_VEC_E;
RVU functional block LF interrupts for any LFs optionally assigned to the PF, enumerated by block_LF_INT_VEC_E.

The mapping of RVUM PF interrupts and RVU functional block LF interrupts is the same for PFs 1-15 as for PF0.

Figure 10:
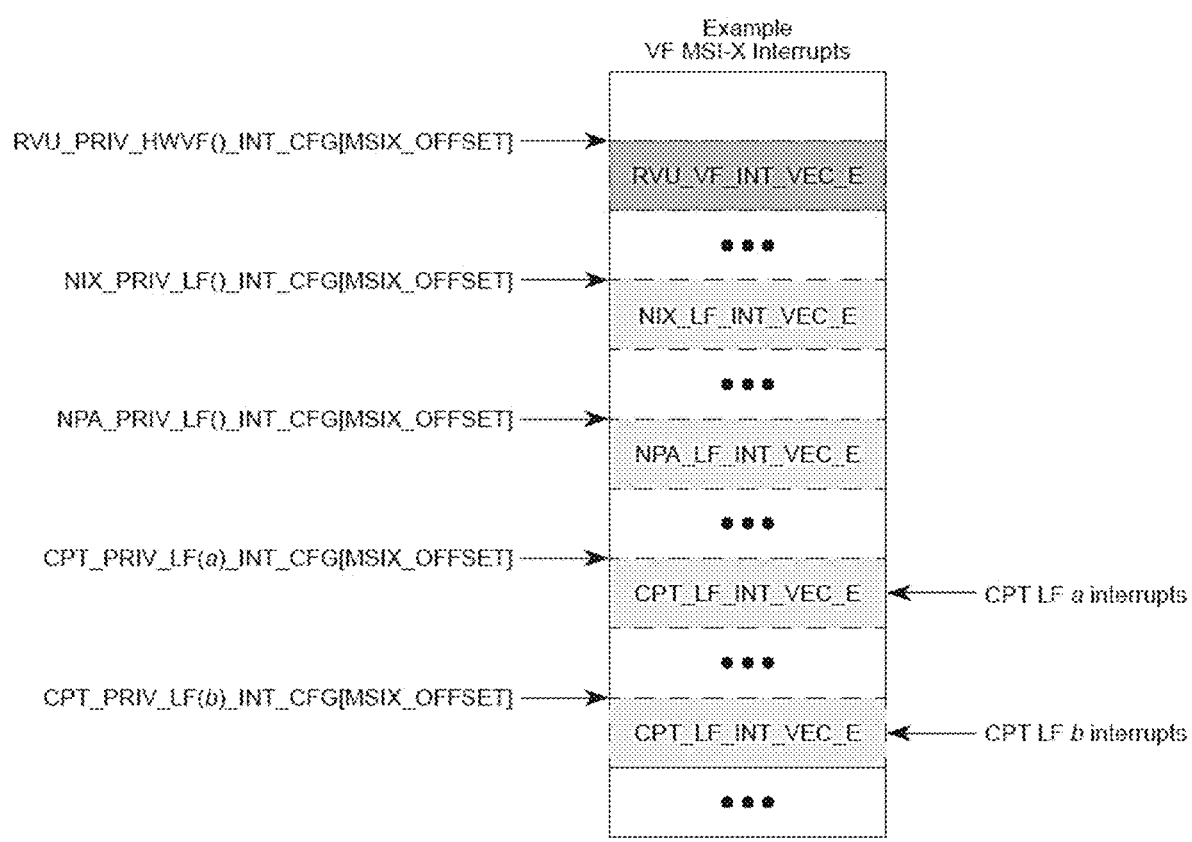
FIG. 10 shows an example of MSI-X vector mapping for an RVU VF in an embodiment of the present invention.

The table shown in FIG. 10 shows an example MSI-X Vector Mapping for an RVU VF. As shown in FIG. 10, the interrupts for each RVU VF include:
RVUM VF interrupts, enumerated by RVU_VF_INT_VEC_E;
RVU functional block LF interrupts for any LFs optionally assigned to the VF,
enumerated by block_LF_INT_VEC_E.

The vector mapping of the RVU VF interrupts (enumerated by RVU_VF_INT_VEC_E) is determined by RVU_PRIV_HWVF(x)_INT_CFG[MSIX_OFFSET]. The vector mappings of the LF interrupts for any RVU functional block LFs assigned to the VF are mapped the same as for LFs assigned to PFs. Note that the example shown in FIG. 10 has two CPT LFs assigned to the VF, and thus there are two sets of CPT LF interrupt vectors. Administrative software ensures that the ranges of MSI-X vectors used by different RVU functional block within each PF/VF do not overlap.

ABSTRACT OF THE DISCLOSURE

A method and system for flexibly assigning hardware resources to physical and virtual functions in a processor system supporting hardware virtualization is disclosed. The processor system includes a resource virtualization unit which is used to flexibly assign hardware resources to physical functions and also flexibly assign local functions to virtual functions associated with one or more of the physical functions. Thereby, standard PCI software is compatible with the physical functions and any associated virtualized hardware resources that have been flexibly assigned to the virtual and local functions.

What is claimed is:
1. A method in a processing system for programming physical functions and virtual functions, the method comprising:
defining a plurality of virtual functions, wherein each of the virtual functions of the plurality of virtual functions comprises a range of local functions;
defining a plurality of physical functions comprising one or more physical functions;
programming a set of the plurality of virtual functions to correspond to a first physical function of the plurality of physical functions;
defining a plurality of hardware resources corresponding to one or more functional blocks, wherein each of the local functions of the range of local functions is assigned a set of the plurality of hardware resources; and programming at least one hardware resource of the plurality of hardware resources to be assigned to one or more of: the first physical function and a first virtual function of the set of the plurality of virtual functions, wherein the range of local functions comprises a first local function in a source socket, wherein the first local function is associated with a first functional block of the one or more functional blocks, wherein the first local function communicates with a second local function in a destination socket using a combination uniquely identifying one of a physical function and a virtual function corresponding to the second local function, and wherein the second local function is assigned from the first functional block.

2. The method of claim 1, wherein the processing system comprises more than one hardware resource and more than one physical function.

3. The method of claim 1, wherein the one or more physical functions follow a PCIe standard, and an administrative function's registers are accessed through PCIe BAR regions of the one or more physical functions.

4. The method of claim 3, wherein software selects the one or more physical functions to access the administrative function's registers.

5. The method of claim 1, wherein DMA operations executed for a hardware resource of the at least one hardware resource use at least one of:
   address translation tables of the first physical function; and
   address translation tables of a designated physical function of the one or more physical functions.

6. The method of claim 1, further comprising assigning one or more administrative functions by software to at least one physical function of the one or more physical functions.

7. The method of claim 1, wherein registers of a hardware resource of the at least one hardware resource are accessed through a physical address range selected from: a physical address range of the first physical function and a physical address range region of the first virtual function.

8. The method of claim 7, wherein:
   a first subset of address bits in the selected physical address range identify a functional block of the one or more functional blocks which provides the hardware resource; and
   a second subset of address bits in the selected physical address range region identify an address slot assigned to the hardware resource.

9. The method of claim 1, further comprising assigning interrupts from the one or more functional blocks to different PCIe MSI-X interrupt vectors belonging to at least one of: the plurality of virtual functions and the one or more physical functions.

10. The method of claim 1, wherein programming the set of the plurality of virtual functions comprises:
   defining one or more ranges of consecutive virtual functions; and
   assigning each range of the consecutive virtual functions to one physical function.

11. The method of claim 1, wherein the plurality of hardware resources is associated with the one or more functional blocks, the one or more functional blocks comprising one or more of:
   a network interface controller;
   a network pool allocator unit;
   a schedule, synchronize, and order unit;
   a timers unit;
   a cryptographic accelerator unit;
   a compression/decompression engine;
   an expression matching engine; and
   a RAID accelerator unit.

12. The method of claim 1, wherein the local functions comprise at least one of: instruction queues, packet queues, work queues, timer rings, and memory pools.

13. The method of claim 1, further comprising:
   determining a number of the physical functions required by a software application;
   determining a number of the virtual functions per physical function of the number of the physical functions; and
   assigning the plurality of hardware resources to each virtual function of the number of the virtual functions.

14. The method of claim 13, wherein:
   said programming the set of the plurality of virtual functions comprises mapping a range of virtual functions of the plurality of virtual functions to the first physical function; and
   said programming at least one hardware resource comprises mapping a range of hardware virtual functions to the first physical function and thereby to the range of virtual functions.

15. The method of claim 1, wherein the combination comprises a unique combination of a physical function number and a function number and has a unique physical address range.

16. A semiconductor device, comprising:
   a plurality of hardware resources operable for processing data and corresponding to one or more functional blocks;
   a resource virtualization unit coupled to the plurality of hardware resources and operable for assigning a plurality of virtual functions to a plurality of physical functions comprising one or more physical functions and for assigning the plurality of hardware resources to a first physical function of the plurality of physical functions and a first virtual function of the plurality of virtual functions, wherein each of the virtual functions of the plurality of virtual functions comprises a range of local functions and each of the local functions of the range of local functions is assigned a set of the plurality of hardware resources; and
   a plurality of processors coupled to the resource virtualization unit and operable for processing the data by the first physical function and the first virtual function utilizing the plurality of hardware resources,
   wherein the range of local functions comprises a first local function in a source socket, wherein the first local function is associated with a first functional block of the one or more functional blocks,
   wherein the first local function communicates with a second local function in a destination socket using a combination uniquely identifying one of a physical function and a virtual function corresponding to the second local function, and
   wherein the second local function is assigned from the first functional block.

17. The semiconductor device of claim 16, wherein interrupts from one or more functional blocks associated with the plurality of hardware resources are assigned to different PCIe MSI-X interrupt vectors belonging to the plurality of virtual functions and the one or more physical functions.

18. The semiconductor device of claim 16, wherein the one or more functional blocks comprise at least one of:
- a network interface controller;
- a network pool allocator unit;
- a schedule, synchronize, and order unit;
- a timers unit;
- a cryptographic accelerator unit;
- a compression/decompression engine;
- an expression matching engine; and
- a RAID accelerator unit.

19. The semiconductor device of claim 18, further comprising a memory coupled to the plurality of processors, wherein the memory stores administrative software that assigns the plurality of virtual functions to the one or more physical functions and assigns the range of local functions to the one or more physical functions and the plurality of virtual functions.

20. The semiconductor device of claim 16, wherein the combination comprises a unique combination of a physical function number and a function number and has a unique physical address range.

21. A processing system, comprising:
- a plurality of hardware resources operable for processing data and corresponding to one or more functional blocks;
- a resource virtualization unit coupled to the plurality of hardware resources that defines a plurality of virtual functions and a plurality of physical functions comprising one or more physical functions, wherein a set of the plurality of virtual functions is programmed to correspond to a first physical function of the plurality of physical functions and at least one hardware resource of the plurality of hardware resources is assigned to one or more of: the first physical function and a first virtual function of the set of the plurality of virtual functions, and wherein each of the virtual functions of the plurality of virtual functions comprises a range of local functions and each of the local functions of the range of local functions is assigned a set of the plurality of hardware resources; and
- a plurality of processors coupled to the resource virtualization unit and operable for processing the data by one of the first physical function and the first virtual function utilizing the at least one hardware resource,
- wherein the range of local functions comprises a first local function in a source socket, wherein the first local function is associated with a first functional block of the one or more functional blocks,
- wherein the first local function communicates with a second local function in a destination socket using a combination uniquely identifying one of a physical function and a virtual function corresponding to the second local function, and
- wherein the second local function is assigned from the first functional block.

22. The processing system of claim 21, wherein interrupts from one or more functional blocks associated with the plurality of hardware resources are assigned to different PCIe MSI-X interrupt vectors belonging to the plurality of virtual functions and the one or more physical functions.

23. The processing system of claim 21, wherein the one or more functional blocks comprise at least one of:
- a network interface controller;
- a network pool allocator unit;
- a schedule, synchronize, and order unit;
- a timers unit;
- a cryptographic accelerator unit;
- a compression/decompression engine;
- an expression matching engine; and
- a RAID accelerator unit.

24. The processing system of claim 23, further comprising a memory coupled to the plurality of processors,
wherein the memory stores administrative software that assigns the set of the plurality of virtual functions to the one or more physical functions and assigns the range of local functions to the one or more physical functions and the set of the plurality of virtual functions.

25. The processing system of claim 21, wherein the combination comprises a unique combination of a physical function number and a function number and has a unique physical address range.

26. A processing system, comprising:
- a plurality of semiconductor devices, each semiconductor device of the plurality of semiconductor devices comprising:
  - a plurality of hardware resources operable for processing data and corresponding to one or more functional blocks;
  - a resource virtualization unit coupled to the plurality of hardware resources and operable for assigning a plurality of virtual functions to a plurality of physical functions comprising one or more physical functions and for assigning the plurality of hardware resources to a first physical function of the plurality of physical functions and a first virtual function of the plurality of virtual functions,
    - wherein each of the virtual functions of the plurality of virtual functions comprises a range of local functions and each of the local functions of the range of local functions is assigned a set of the plurality of hardware resources,
    - wherein the range of local functions comprises a first local function in a source socket,
    - wherein the first local function is associated with a first functional block of the one or more functional blocks,
    - wherein the first local function communicates with a second local function in a destination socket using a combination uniquely identifying one of a physical function and a virtual function corresponding to the second local function, and
    - wherein the second local function is assigned from the first functional block; and
  - a plurality of processors coupled to the resource virtualization unit and operable for processing the data by the first physical function and the first virtual function utilizing the plurality of hardware resources,
wherein:
- a first hardware resource in a first semiconductor device of the plurality of semiconductor devices forwards operation requests initiated by one of hardware and software to a second hardware resource in a second semiconductor device of the plurality of semiconductor devices; and
- the second hardware resource executes operations for the operation requests received from the first hardware resource.

27. The processing system of claim 26, wherein:
the first hardware resource requests a response when the first hardware resource forwards an operation request of the operation requests to the second hardware resource;

the second hardware resource sends the response to the first hardware resource after executing the operation request; and the first hardware resource signals completion of the operation request to the one of the hardware and software that initiated the operation requests.

28. The processing system of claim 26, wherein the combination comprises a unique combination of a physical function number and a function number and has a unique physical address range.

* * * * *